United States Patent [19]
Redford et al.

[11] 3,938,590
[45] Feb. 17, 1976

[54] METHOD FOR RECOVERING VISCOUS ASPHALTIC OR BITUMINOUS PETROLEUM

[75] Inventors: David A. Redford, Fort Saskatchewan; David L. Mitchell, Edmonton, both of Canada

[73] Assignee: Texaco Exploration Canada Ltd., Calgary, Canada

[22] Filed: June 26, 1974

[21] Appl. No.: 483,173

[52] U.S. Cl. ................ 166/270; 166/271; 166/272
[51] Int. Cl.² E21B 43/22; E21B 43/24; E21B 43/26
[58] Field of Search .......... 166/270, 271, 272, 261, 166/259, 300, 303

[56] References Cited
UNITED STATES PATENTS

| | | | |
|---|---|---|---|
| 2,695,163 | 11/1954 | Pearce et al. | 166/261 X |
| 2,906,337 | 9/1959 | Hennig | 166/272 X |
| 3,221,813 | 12/1965 | Closmann et al. | 166/272 X |
| 3,398,791 | 8/1968 | Hurd | 166/270 |
| 3,823,776 | 7/1974 | Holmes | 166/270 X |
| 3,825,066 | 7/1974 | Redford | 166/271 X |
| 3,838,738 | 10/1974 | Redford et al. | 166/271 |
| 3,847,219 | 11/1974 | Wang et al. | 166/272 X |

*Primary Examiner*—Stephen J. Novosad
*Attorney, Agent, or Firm*—T. H. Whaley; C. G. Ries; Jack H. Park

[57] ABSTRACT

Disclosed is a process for recovering petroleum from subterranean, viscous asphaltic or bituminous petroleum-containing formations, including subterranean tar sand deposits. A zone of gas permeability is established in the formation first, such as by fracturing or gas sweeping a section of the formation. Oxidizing gas such as oxygen, air, oxygen enriched air, ozone, or chlorine, or a mixture of steam and an oxidizing gas is introduced into the zone of increased gas permeability to expand the zone and further to cause a reaction to occur between the oxidizing gas and the oxygen-susceptible groups or labile groups associated witn the bituminous or asphaltic petroleum molecules forming acidic or aldehyde groups. Next, a gaseous or liquid alkalinity agent such as ammonia is introduced into the formation to react with the oxidatively pre-treated groups in the bituminous or asphaltic petroleum to form surface active agents or surfactants in situ. Finally, steam or a mixture of steam and an alkalinity agent such as ammonia or steam and air or a mixture of steam, oxidative gas and an excess of ammonia is introduced into the treated zone to recover petroleum. This process may be applied as a push-pull process or it may be applied in a multi well, throughput process. In a preferred embodiment, gaseous ammonia serves as an alkaline agent to neutralize the surface active agents formed in the formation, and also functions as a non-condensable gas to prevent loss of gas permeability as the viscous petroleum is heated in the final stages of the process.

11 Claims, 1 Drawing Figure

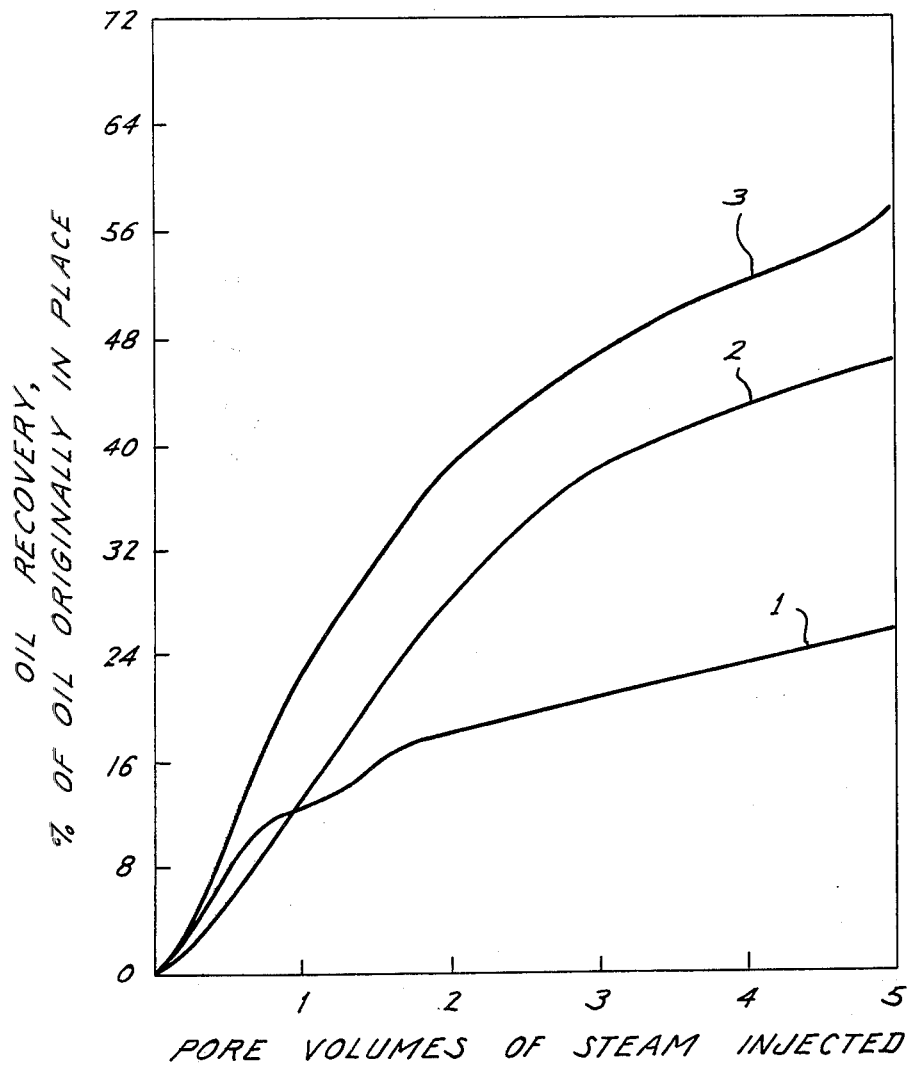

METHOD FOR RECOVERING VISCOUS ASPHALTIC OR BITUMINOUS PETROLEUM

BACKGROUND OF THE INVENTION

1. Field of the Invention

This invention is a method for recovering petroleum from subterranean petroleum-containing formations. More particularly, this concerns a method for recovering viscous, asphaltic or bituminous petroleum from formations containing same, including tar sand deposits. Still more particularly, this invention concerns a method whereby surface active agents are generated in situ in the bituminous or asphaltic petroleum by contacting the labile groups associated with the petroleum molecules with an oxidizing gas to activate the group followed by contacting the oxidized groups with an alkalinity agent such as ammonia gas.

2. Description of the Prior Art

Petroleum is recoverable from subterranean formations in which it has accumulated only if certain essential elements co-exist; namely, the formation must have adequate permeability or interconnected flow channels so that a fluid will flow from one portion of the formation to the other; the petroleum viscosity must be sufficiently low that it will move if the flow channels exist and a pressure differential is applied to the fluids; and finally, a source of energy to provide the pressure differential to induce the fluid movement must exist naturally or be supplied to the formation. When all three of these conditions co-exist, so-called primary recovery in which fluid moves to the surface under its own initiative without any type of formation treatment is possible. Supplemental recovery is necessary when any of these basic elements is missing or when the energy has been depleted through primary recovery, and frequently it is necessary to take corrective measures for both petroleum viscosity and simultaneously supply fluid drive energy.

The most extreme examples of formations requiring substantial treatment in order to induce the flow of petroleum therefrom are the so-called bituminous sands or tar sands deposits. Extensive tar sand deposits are found in the western United States, in northern Alberta, Canada, and in Venezuela, and lesser deposits are located in Europe and Asia. The Athabasca deposits in Alberta, Canada, are the most famous, and it is estimated that these deposits contain as much as 700 billion barrels of petroleum. Some production has been obtained from the near surface deposits by strip mining, but essentially no commercial production has been obtained from deep subterranean deposits for several reasons. The fluid permeability of tar sand deposits in their initial state is extremely low, and the viscosity of petroleum at formation temperatures is in the range of millions of centipoise. Accordingly, substantial treatment would be necessary to reduce the high petroleum viscosity so as to achieve petroleum flow under the influence of externally applied drive pressure, and the low permeability of the formation interferes with any such treatment.

Several methods have been described in the literature for recovering bituminous petroleum from tar sand deposits. One of the more popular processes is referred to as a steam emulsification drive process. The first step involves establishment of a high permeability communication path, preferably in or near the bottom of the tar sand deposit, extending from one well to another. Steam and a minor amount of a caustic substance such as sodium hydroxide is introduced into the communication path and flows to the other well. An oil-in-water emulsion is formed, the bituminous petroleum comprising the discontinuous phase of the emulsion. The viscosity of this emulsion is in the range of only a few centipoise, and so it readily moves to the production well for recovery to the surface. Numerous problems have been encountered in actual application of this process, however, including lower than desirable concentrations of bituminous petroleum in the produced emulsion, and the production of a portion of the petroleum in the form of a water-in-oil emulsion which is more viscous than the free bitumen and which resists resolution into its separate phases by demulsification technology. In addition, the communication path is difficult to establish.

Other processes have been described such as in situ combustion as well as various modifications of solvent extraction processes. In commonly owned co-pending applications Ser. No. 481,581 and 481,582 both filed June 21, 1974, a low temperature, controlled oxidation process is described. This process appears more applicable to the low permeability tar sand deposits than does the high temperature in situ combustion reaction.

In view of the foregoing discussion, it can be appreciated that there is a substantial, unfulfilled need for a method for in situ separation of bituminous petroleum from tar sand deposits which can be conducted in the deposits which are too deep to be exploited by means of strip mining. There is an especially acute need for an economical method for extracting a reasonably high percentage for the petroleum contained in these deposits. There is an especially serious need for a method for recovering bitumen in the form of an oil-in-water emulsion under conditions which will exclude the formation of a water-in-oil emulsion. There is similarly an unfulfilled need for a method for increasing the concentration of bitumen in the oil-in-water emulsion produced during the steam-emulsification drive process.

SUMMARY OF THE INVENTION

Our invention comprises a method for recovering viscous, asphaltic or bituminous petroleum from subterranean formations. The process makes of the fact that there are naturally occurring labile groups associated with the bituminous petroleum which can be activated by being contacted with an oxidizing gas. After the labile groups have been activated, an alkalinity agent such as ammonium hydroxide or gaseous ammonia is utilized to neutralize the oxidized groups, thereby converting them to the water soluble form so that they may aid in the formation of an oil-in-water emulsion during subsequent process steps. Gaseous ammonia is an especially preferred step since it serves as the neutralization agent and also to expand the zone of gas permeability, thereby extending the contact area of the fluids injected subsequently. Steam is thereafter injected, in order to heat the bituminous petroleum to render it more mobile and form an oil-in-water emulsion. The surface active compounds generated by the oxidative gas and the ammonia gas reaction cause the formation of the oil-in-water emulsion, increasing the bituminous petroleum concentration in the emulsion and resulting in the production of little or no water-in-oil emulsion. Ammonia may be injected simultaneously with the steam. Alternatively, steam injection alone may be continued awhile, with brief interruptions during which time ammonia or a mixture of steam and ammonia are introduced into the formation. Production is in the form of a fluid comprising an oil-in-water emulsion in which the bituminous petroleum is the discontinuous phase. The pressure differential is reduced. The petroleum content of the emulsion will be in the range of from about 9 to about 15 percent by volume. Essentially no free bitumen or water-in-oil emulsion is produced.

BRIEF DESCRIPTION OF THE DRAWINGS

The attached drawing illustrates graphically the percent oil recovery obtained in laboratory evaluation of the process of our invention compared to steam alone and to a mixture of steam and air.

DESCRIPTION OF THE PREFERRED EMBODIMENT

Briefly, our process may be considered as comprising four phases; namely, (1) forming an initial entry zone or a zone of increased fluid permeability in at least a portion of the formation from which recovery is to be obtained; (2) followed by introduction of an oxidizing gas into the entry zone so as to oxidize labile groups to form acidic or aldehyde groups; (3) followed by introduction of an alkalinity agent, in order to neutralize the oxidized groups into hydrophilic (water loving) groups; and (4) finally followed by the principal oil recovery drive fluid such as steam. These four phases are discussed in greater detail below.

I. Forming the Communication Path

Occasionally a formation exists which has naturally occurring adequate gas permeability so that the first phase may be eliminated. This is rare, particularly in the instance of very viscous oil-containing formations or tar sand deposits.

When the formation to be exploited does not already contain a high permeability streak or zone, some process must be applied to the formation for the purpose of opening up some interval in the formation. One successful method for forming the initial entry zone is by hydraulic fracturing. This process, which is commercially available from oil field service companies, involves drilling a well into a formation, establishing fluid flow with the portion to be treated, and introducing a hydraulic fluid under such high pressure that the formation is physically fractured and parted. Generally, the fracture will heal once the hydraulic pressure is relieved unless some subsequent treatment is applied to the fracture zones to maintain them in an open configuration. This, too, is well known in commercial oil field service operations, and is accomplished by introducing a liquid containing granular propping agent into the fractures. Generally, coarse sand or gravel slurried in an aqueous carrier fluid is utilized for this purpose. The coarse, granular material prevents the fractures from healing or closing after hydraulic pressure is relieved, but maintains fluid permeability through the fractures.

Once the fracture has been established, it is generally desirable or necessary to expand the fracture into a high permeability communication path by subsequent treatment. This may involve injecting a solvent into the propped fracture zone to dissolve bitumen from tar sand adjacent to the fracture zone, thereby extending the size of the high permeability streaks created by the fracturing operation.

Another method involves introducing a hot alkaline fluid such as steam or hot water containing an alkalinity agent such as sodium hydroxide into the propped fracture, which emulsifies the bituminous petroleum in the adjacent areas, thereby reducing the saturation of bituminous petroleum in the material immediately adjacent to the propped fracture zone, and thus increasing the volume of the high permeability streak created.

In a slightly different embodiment, a noncondensable, inert gas such as nitrogen is introduced into the unfractured formation in order to sweep out any mobile fluids existing in the flow channels of the formation, thereby increasing the fluid receptivity of a portion of the formation. This is especially applicable to throughput operations in which there are two wells drilled into and completed in the subterranean formation, and gas is introduced into the formation via one well until it is flowing from the other well, thereby creating a gas-swept zone between the wells. After gas has swept through a segment of a formation for some period of time, usually 2–5 days being satisfactory, it is possible to introduce liquids into the formation for the purpose of removing bitumen from the gas-swept zone, whereas it would have been difficult or impossible to introduce the liquids into the formation prior to the gas sweep step. For example, after nitrogen injection through a portion of the formation has continued for 12 to 24 hours, it is possible to introduce an effective solvent for the bituminous petroleum such as aromatic hydrocarbons including benzene and toluene, aliphatic hydrocarbons including propane, butane, pentane, etc., carbon disulfide, carbon tetrachloride, or any other suitable material which is miscible with the formation petroleum and which forms a solution having a viscosity substantially lower than the formation petroleum.

Depending on the distance between adjacent wells being utilized in the process described immediately above, it is sometimes possible to introduce a solvent into the gas-swept zone in the formation such that the solvent will pass through the zone to the adjacent well and solvent with petroleum dissolved therein can be removed from the adjacent well. Once solvent flow from well to well is achieved, the flow can generally be maintained, and so long as the flow is maintained the communication path will be expanded thereby.

In relatively low transmissivity formations, or if the well spacing is such that well to well flow solvent is initially unobtainable, the gas-swept zone may be expanded by introducing solvent into both wells simultaneously until the pressure less than the fracture pressure of the formation is achieved, followed by relieving pressure on both wells and permitting solvent with bitumen dissolved therein to flow back into the wells. Once flow is terminated, solvent injection may be resumed, and several cycles of solvent injection and production from the same wells may be necessary in order to extend the gas-swept-zone-solvent-depleted zone far enough into the formation so that well-to-well solvent transmission may be achieved.

By either of the above methods, once solvent has been passed through the gas-swept zone for a period of time, the efficiency of the process decreases since the volume of solvent increases as the thickness of the extracted zone increases, whereas the surface area is not increased appreciably. Accordingly, the concentration of petroleum in the solvent being produced from the remotely located well will decline, and this will signal the efficient end point for this phase of the operation.

Another method for expanding the gas-swept zone into a suitable communication path involves introducing an aqueous fluid, such as hot water or steam into the formation to extract bitumen from the gas-swept zone in the formation. Although the viscosity of bitumen in its native state is in the range of several million centipoise, the viscosity-temperature relationship is exceedingly sharp, and the viscosity of bituminous petroleum from a tar sand formation such as the Athbasca Tar Sand deposit is only two or three centipoise at 300°F. Accordingly, if the temperature of a portion of the gas-swept zone can be raised to a temperature approaching 300°F., the viscosity of the bituminous petroleum can be reduced so that it will flow to the adjacent well. Thus, the bitumen saturation will be reduced in the gas-swept zone, in order to produce a high permeability communication zone between wells.

The efficiency of bitumen removal from the gas-swept zone, or from a fracture zone, by means of a hot aqueous fluid is enhanced by incorporating a minor amount of an alkalinity agent such as sodium hydroxide into the fluid, in order to encourage the formation of a low viscosity oil-in-water emulsion. An oil-in-water emulsion generally has a viscosity only slightly higher than the viscosity of water at the particular temperature of the emulsion, and so it flows readily to the adjacent well.

II. Oxidizing the Labile Groups

Once a high permeability communication path is established between adjacent wells according to the above described procedures, an oxidizing gas is introduced into the high permeability path in order to oxidize the labile groups associated with the bituminous or asphaltic petroleum present in the formation. Air may be utilized for this purpose, and one preferred embodiment of the process of our invention comprises pumping air into the formation at the maximum safe pressure, in order to oxidize the materials present in the formation.

It should be noted here that in the instance of pumping any gaseous substance into a subterranean formation such as a tar sand deposit, care should be maintained to keep the injection pressure below a value which will cause fracturing or rupture of the overburden above the petroleum formation being treated. As a general rule of thumb, the injection pressure in pounds per square inch should not exceed the thickness of the overburden above the petroleum formation measured in feet. Thus, if a tar sand deposit is located under 500 feet of overburden, the injection pressure should be kept below 500 pounds per square inch to avoid fracturing the overburden. Once a fracture is established through the overburden to the surface, any fluid injected into that portion of the formation will channel through the fracture to the surface and will be ineffective for any subsequent oil recovery operations.

The reaction between the injected oxidizing gas, e.g. air or oxygen, and the labile groups present in the asphaltic petroleum is not a high temperature combustion such as is sometimes practiced in oil recovery operations. Thus it is not necessary to provide an extraneous source of heat to raise the temperature of a portion of the formation adjacent the air injection well to the combustion or ignition temperature of the petroleum as is done when using in situ combustion. It is sufficient to inject air into the formation and maintain the pressure at the highest point possible, whereby low temperature oxidation will occur, activating the potentially surface active agent forming materials.

Oxygen enriched air may also be utilized advantageously in this process, and if available at a reasonable price, essentially pure oxygen may be used. Chlorine or oxides of chlorine may also be used for the oxidation step, although the preferred embodiment utilizes an oxygen-containing gas or pure oxygen for this step.

In a slightly different embodiment, a mixture of oxygen or any oxygen-containing gas or air and steam is introduced into the formation. The steam moderates the reaction temperature resulting in a low temperature oxidation. The ratio of the oxygen-containing gas to steam may be from .1 to 3 standard cubic feet per pound of steam, and preferably is around .25.

In a throughput operation in which a low permeability communication path has been established between adjacent wells, it may be necessary to throttle or choke the gaseous effluents of the production well in order to maintain the pressure in the high permeability communication path at a value which will result in rapid oxidation of the labile groups to the desired acids or aldehydes groups.

It may be stated at this point that the groups created by the reaction between the oxidizing gas and the labile groups are phenolic, sulfonic, carboxylic, or thiolic functional groups. Any of these anionic groups are hydrophilic or water loving. The rest of the hydrocarbon molecule comprises the oil soluble or hydrophobic moiety. Before such materials are effective surface active agents such as are utilized in the formation of oil-in-water emulsions, the oxidized groups should be neutralized with an alkalinity agent to convert the anionic group to a water soluble salt form.

After the petroleum present in and around the high permeability zone in the formation has been exposed to the oxidizing gas for a period of from about 0.5 hours to about 10 hours, preferably around 2 hours, injection of the oxidizing gas into the high permeability zone should be suspended. The time required for oxidation is generally pressure dependent, and longer times may be required.

III. The Neutralization Step

Any type of liquid or gaseous alkalinity agent may be used in the step of neutralizing the oxidized groups. Aqueous solutions of hydroxides of sodium, potassium or ammonia may be used. Gaseous ammonia is also a very desirable material for this step. Anhydrous ammonia may be introduced in a gaseous form into the permeable zone. Ammonia may be injected into one well and ammonia removed from the other well for a period of time in order to insure adequate contact between the ammonia in the pretreated zone so as to facilitate reaction of ammonia with the oxidizing gas activated compounds in formation petroleum. In another embodiment, ammonia is injected into both wells and the pressure is maintained for a period of time from about 1 to about 48 hours. Although the neutralization reaction occurs essentially instantaneously, a soak period is desirable to permit gas penetration into the tar sand material. Again it is necessary to observe the overburden-thickness related pressure limitation that the injection pressure in pounds per square inch not exceed the overburden thickness expressed in feet, in order to avoid fracturing the overburden.

In a slightly different embodiment, steam and ammonia are injected simultaneously or sequentially into the formation, so that ammonia and steam may react in the pretreated zone to form ammonium hydroxide, which reacts with the oxidizing gas activated groups in the formation petroleum. One particularly attractive way for accomplishing this is to introduce steam into the formation for a brief period after conclusion of the oxidizing gas injection, so that the steam vapors may be absorbed uniformly throughout the zone, so the ammonia gas may react with the absorbed water vapor to form ammonium hydroxide uniformly throughout the zone.

After the permeable zone has been treated with ammonia for at least 1 hour, ammonia injection may be discontinued and the principal recovery fluid introduced into the formation.

IV. Oil Recovery

In one embodiment, steam is introduced into the formation for the purpose of heating the viscous, bituminous petroleum to reduce its viscosity, and to form an oil-in-water emulsion which is produced at the production well. In a slightly different embodiment, ammonia is injected simultaneously with the steam during the recovery phase, which accomplishes several beneficial results. Ammonia functions as a non-condensable gas, which prevents the formation of an immobile bank of petroleum in the formation which plugs the communication path, thereby preventing further production of petroleum through that path until some remedial treatment has been accomplished. Additionally, the alkaline nature of ammonia ensures that neutralization of the labile groups in the formation petroleum will continue as previously uncontacted materials are exposed during the process of the oil recovery operation. The ratio of ammonia to steam during such an operation may be anywhere from .05 to 2 standard cubic feet of ammonia per pound of steam, and the preferred range is from 0.1 to 0.4 standard cubic feet per pound.

The process of our invention may be better understood by reference to the following field example, which is offered only as an illustrated, preferred embodiment of our process, and is not intended to be limitative or restrictive.

V. Field Example

A tar sand deposit is located under an overburden thickness of 650 feet, and the tar sand deposit is 80 feet thick. Two wells are drilled to the bottom of the deposit, the wells being 75 feet apart. Both wells are completed in the bottom 5 foot section of the tar sand deposit, and a gravel pack is formulated around the slotted liner on the end of the production tubing in each well to restrain sand flow into the wells.

Air is injected at an initial low rate into one well and the other well is held open to the atmosphere.

The initial air injection rate into the first well is 250 standard cubic feet per hour. This rate is maintained until an indication of air production is obtained from the remotely located well. The air injection rate is increased at the rate of about 10 percent every two hour period until an injection rate of 1000 standard cubic feet per hour is obtained. This level of air injection is continued for 24 hours to ensure an adequate air-swept zone has been established in the formation.

A mixture of approximately 50 percent natural gasoline, which is predominantly $C_5$ through $C_7$ saturated hydrocarbons, and 50 percent mixed aromatic solvent, which is predominantly benzene and toluene, is pumped into each well at a pressure of 300 pounds per square inch until the injection rate drops materially, indicating the maximum penetration has been achieved. The pressure is released and solvent with bituminous petroleum dissolved therein is pumped out of each well. Solvent injection into each well is again performed to a maximum pressure of 300 pounds per square inch, followed by a cycle of production of solvent with bituminous petroleum dissolved therein. Solvent is then injected into one well and it is determined that solvent is flowing readily into the other well, indicating that well-to-well communication has been established. Solvent injection is continued for approximately one week, which depletes the air-swept zone, ensuring that a good stable communication path has been established between the two wells.

The next phase of the operation comprises introduction of an oxidizing gas into the communication path to oxidize the labile groups in the petroleum. A mixture of essentially pure oxygen and 80 percent quality steam is injected into both wells and the pressure is maintained at 450 pounds for two days. This ensures that good contact and penetration into the tar sand material adjacent the communication zone is achieved. The pressure is then relieved and the gas is allowed to flow out of the well. Some bitumen is produced during this interval, and this material is removed from the wells.

Essentially pure ammonia gas is then introduced into each well and the pressure raised to 400 pounds per square inch. The pressure is maintained, injecting ammonia as necessary to increase the pressure to its desired maintenance level for 1½ days.

After the prolonged ammonia contact phase is completed, the pressure is again released and the ammonia gas purged from the interval. A steam generator is installed, and boiler feed quality water passed to the generator to produce 85 percent quality steam at a temperature of 375°F. A mixture of steam and ammonia at a ratio of approximately 0.3 standard cubic feet of ammonia per pound of steam is introduced into one well, with production of gases and liquids being taken from the adjacent well. This ratio is maintained for 24 hours, after which the ratio of ammonia to steam is reduced to approximately 0.2 standard cubic feet per pound of steam, and this ratio is maintained continually throughout the remainder of the recovery operation. Because of the relatively low pressure differential between the wells as a result of the pretreatment, it is possible to maintain the steam injection rate at 2000 barrels of steam per day per well. An emulsion of bituminous petroleum in water is produced from the adjacent well, the bituminous petroleum content averaging around 13 percent by volume. This is readily resolved into essentially pure bitumen and water by contacting the produced liquid with a mineral acid. The bituminous petroleum separated from the emulsion is essentially free of emulsified water, so that no further treatment is necessary.

VI. Experimental Section

A series of three laboratory runs were performed to substantiate the process of our invention. The cell used in all three runs was a section of steel pipe, 18 inches in diameter and 15 inches long. One inch dimeter wells were included, one for fluid injection and one for production, each well being positioned 3 inches from the cell wall and 180° apart. The top of the cell was equipped with a piston and sealing rings by means of which hydraulic pressure can be imposed on tar sand material packed in the cell to simulate overburden pressure.

The cell was packed with tar sand material. A clean sand path, approximately ⅛ inch thick and 2 inches wide was formed between the wells to serve as the communication path. The tar sand material was compressed under hydraulic pressure for several days.

In run 1, steam was injected into the cell and bitumen produced from the production well.

The cumulative production was recorded as a function of time and also as a function of pore volumes of steam injected. As can be seen from curve 1 in the attached figure, the oil recovery as a percentage of the oil originally in place reached a value of about 24 percent at 5+ pore volumes of steam.

A second run in a cell packed as described above, was run using a mixture of steam and air. Curve 2 shows that the percent oil recovery is substantially better than with steam alone (curve 1) at all values of pore volumes of steam injected.

Run 3, which corresponds to the process of our invention, was run in a similarly prepared cell. The bitumen was exposed to air, steam, and liquid ammonium hydroxide. As can be seen, the air-steam-ammonium hydroxide, curve 3, is substantially superior to either the steam or steam plus air run. (Steam volume for curve 3 was corrected for the volume of ammonium hydroxide). At a value of two pore volumes of steam injected, a reasonable commercial level, the recovery for steam was about 18 percent; for steam and air it was about 26 percent; and for steam, air and ammonium hydroxide, it was about 36 percent. In addition to the increased oil recovery, it was observed that the pressure differential between the injection wells was substantially less for run 3 than for either runs 1 or 2. Furthermore, the produced fluid was substantially all in the form of an oil-in-water emulsion whereas appreciable amounts of water-in-oil emulsion was produced in runs 1 and 2.

Thus, we have disclosed and demonstrated that naturally occurring, labile groups on the petroleum molecule are oxidized on being contacted with an oxidizing gas such as air or oxygen for a period of time to form acidic or aldehyde groups, after which they are contacted with an alkalinity agent such as ammonia for the purpose of forming a water soluble salt of the compound. The materials produced are essentially anionic surfactants similar to petroleum sulfonate. The advantages resulting from this process include increased oil recovery, formation of an oil-in-water emulsion having an increased content of oil in the emulsion as compared to what would be obtained without the oxidizing gas-alkalinity agent pretreatment of the formation, and the production of essentially no water-in-oil emulsion which is difficult to break. The pressure differential is also reduced. The continued use of ammonia results in the continued generation of surface active agents from bituminous petroleum as previously uncontacted portions of the petroleum formation are contacted by the recovery fluid. Additionally, the presence of ammonia gas with steam ensures that fluid transmissivity will be maintained, since there will be no formation of a fluid-impermeable block of immobile petroleum in the communication path as frequently occurs when steam is introduced into tar sand deposits.

While our invention has been disclosed in terms of a number of specific illustrative embodiments, it is not so limited since many variations thereof will be apparent to persons skilled in the related arts. Similarly, while mechanisms have been proposed to explain the benefits resulting from the process of our invention, it is not necessarily hereby represented that these are the only and even the principal mechanisms which result from the application of this process. It is our desired intention that our invention be limited and restricted only by those limitations and restrictions as apply in the appended claims.

We claim:

1. A method of recovering viscous, asphaltic or bituminous petroleum from a permeable, subterranean, viscous asphaltic or bituminous petroleum-containing formation including a tar sand deposit, penetrated by at least one well in fluid communication with the formation comprising:
    a. forming a zone of increased permeability in at least a portion of the formation,
    b. introducing chlorine gas into said zone of increased permeability to oxidize labile groups on the bituminous petroleum, to form surface active agents in the formation,
    c. introducing an alkalinity agent into said zone of increased permeability to neutralize oxidized groups generated by action of the chlorine gas,
    d. introducing into the formation a recovery fluid selected from the group consisting of steam, a mixture of steam and an oxygen containing gas including air, a mixture of steam and ammonia, or a mixture of steam, ammonia and an oxygen containing gas, and
    e. recovering formation petroleum from the formation.

2. A method as recited in claim 1 wherein the step of forming the zone of increased permeability comprises fracturing the formation, introducing a propping agent, then introducing a solvent to dissolve bituminous petroleum from the tar sand material around the fracture to convert the propped fracture zone into an enlarged zone of high permeability.

3. A method as recited in claim 1 wherein the step of forming said zone of high permeability comprises fracturing and introducing a propping material into the fractured zone followed by introducing a hot aqueous fluid selected from the group consisting of steam and hot water into the propped fracture zone to remove bituminous petroleum from the tar sand material adjacent to the propped fracture zone to convert the propped fracture zone into an enlarged zone of high permeability.

4. A method as recited in claim 3 wherein the hot aqueous fluid also contains an alkalinity agent.

5. A method as recited in claim 1 wherein steam is mixed with the chlorine gas.

6. A method as recited in claim 1 wherein the alkalinity agent is selected from the group consisting of aqueous solutions of hydroxides of ammonia, sodium and potassium, mixtures thereof, and ammonia gas.

7. A method as recited in claim 6 wherein the alkalinity agent is an aqueous solution of sodium hydroxide.

8. A method as recited in claim 6 wherein the alkalinity agent is an aqueous solution of ammonium hydroxide.

9. A method as recited in claim 6 wherein the alkalinity agent is an aqueous solution of potassium hydroxide.

10. A method as recited in claim 6 wherein the alkalinity agent is gaseous ammonia.

11. A method as recited in claim 1 wherein steam is introduced into the zone of increased permeability between the step of introducing chlorine gas in the step of introducing alkalinity agent.

* * * * *